United States Patent
Hugill

(10) Patent No.: US 7,111,673 B2
(45) Date of Patent: Sep. 26, 2006

(54) SYSTEM FOR STRIPPING AND RECTIFYING A FLUID MIXTURE

(75) Inventor: James Anthony Hugill, Amsterdam (NL)

(73) Assignee: Stichting Energieonderzoek Centrum Nederland, Le Petten (NL)

( * ) Notice: Subject to any disclaimer, the term of this patent is extended or adjusted under 35 U.S.C. 154(b) by 0 days.

(21) Appl. No.: 10/485,365

(22) PCT Filed: Jul. 31, 2002

(86) PCT No.: PCT/NL02/00517

§ 371 (c)(1),
(2), (4) Date: Jun. 7, 2004

(87) PCT Pub. No.: WO03/011418

PCT Pub. Date: Feb. 13, 2003

(65) Prior Publication Data

US 2004/0200602 A1    Oct. 14, 2004

(30) Foreign Application Priority Data

Jul. 31, 2001    (NL) .................................... 1018672

(51) Int. Cl.
  *F28F 3/02*    (2006.01)
  *F28F 13/08*    (2006.01)
(52) U.S. Cl. ...................................... 165/166; 165/147
(58) Field of Classification Search ................ 165/146, 165/147, 164, 166, 140
See application file for complete search history.

(56) References Cited

U.S. PATENT DOCUMENTS

| | | | | |
|---|---|---|---|---|
| 2,018,163 A | * | 10/1935 | Wells ......................... | 165/147 |
| 2,429,508 A | * | 10/1947 | Belaieff ...................... | 165/166 |
| 3,175,962 A | * | 3/1965 | Holtslag ..................... | 165/147 |
| 3,339,631 A | * | 9/1967 | McGurty et al. ........... | 165/147 |
| 3,492,828 A | | 2/1970 | Ruckborn | |
| 3,749,155 A | | 7/1973 | Buffiere | |
| 4,156,625 A | * | 5/1979 | Wachendorfer, Sr. ....... | 165/147 |
| 4,715,431 A | | 12/1987 | Schwarz et al. | |
| 4,749,032 A | * | 6/1988 | Rosman et al. ............. | 165/166 |
| 4,762,171 A | * | 8/1988 | Hallstrom et al. .......... | 165/147 |
| 4,785,879 A | * | 11/1988 | Longsworth et al. ....... | 165/164 |

FOREIGN PATENT DOCUMENTS

| | | |
|---|---|---|
| CH | 435 347 | 5/1967 |
| EP | 0 697 573 | 2/1996 |
| EP | 0 726 085 | 8/1996 |

* cited by examiner

Primary Examiner—Teresa J. Walberg
(74) Attorney, Agent, or Firm—Young & Thompson

(57) ABSTRACT

A heat exchanger is used between the stripper section and rectifier section. The heat exchanger (10) has channels closed on all sides with an end inlet and end outlet for the related section. A compressor is fitted between the sections. According to the invention the heat exchanger is a so-called compact heat exchanger, that is to say a heat exchanger made up of a series of adjacent plates (15, 16) between which channels (11, 12) closed on all sides for the related section are delimited. These channels (11, 12) extend essentially vertically and are so constructed that all liquid contained therein is able to move towards the bottom of the section concerned. The flow cross-section of the channels of the stripper/rectifier section changes depending on the process carried out therein.

9 Claims, 3 Drawing Sheets

SYSTEM FOR STRIPPING AND RECTIFYING A FLUID MIXTURE

The present invention relates to a system for stripping and rectifying a fluid mixture, comprising a heat exchanger with channels closed on all sides with end inlet and end outlet for a stripper section and a rectifier section, a compressor being fitted between the inlets of said stripper section and rectifier section, said heat exchanger being made up of a series of adjacent plates between which channels closed on all sides for said stripper section or rectifier section are alternately delimited, and said channels extending essentially vertically and being so constructed that all liquid contained therein is able to move towards the bottom of said section.

A system of this type is disclosed in U.S. Pat. No. 5,592,832. The so-called Heat Integrated Distillation Column process is described in this document. This is a process where a compressor is fitted between the stripper section and rectifier section. Moreover, direct heat exchange takes place between the rectifier section and stripper section, that is to say there is direct heat transfer from the rectifier section to the stripper section in a shell-and-tube heat exchanger. As a result, condenser and reboiler can be made of relatively small size. The efficiency from conventional distillation can be improved in this way. The pressure difference generated as described in U.S. Pat. No. 5,592,832 is associated with a corresponding difference in operating temperature, as a result of which heat can be transferred directly from the rectifier section to the stripper section.

A system of this type is used, for example, for separating hydrocarbons having boiling points which are close to one another, such as, for example, propane and propene. The mixture is fed to the top of the stripper section and, on the one hand, falls through the stripper section and, on the other hand, is pumped by the compressor to the inlet of the rectifier section, which is at the bottom of the vertically arranged rectifier section. Packing can optionally be present in the various sections. During operation there are relatively large gas and liquid streams in the top of the stripper section and minor gas and liquid streams at the bottom. The situation is reversed for the rectifier section. There are large gas and liquid streams at the bottom, that is to say the inlet, and minor gas and liquid streams at the top.

As a result of this arrangement it is possible usefully to use the relatively high value heat from the rectifier section in the stripper section. This is in contrast to prior processes where heat that was of relatively low value was recovered exclusively in the condenser and where relatively high value heat was exclusively supplied to the reboiler. The process yield can be increased as a result.

A heat exchanger of the plate/fin type with two groups of passageways for rectifying and stripping is described in U.S. Pat. No. 5,592,832. This heat exchanger consists of a number of vertically extending plates/fins arranged in parallel alongside one another. A Heat Integrated Distillation Column (HIDiC) process is also described in EP 0 726 085 A1.

An aim of the present invention is to provide a system with which a heat exchanger can be implemented in a very compact manner. The heat and mass transfer can be optimised as a result of the compact construction.

This aim is achieved with a system as described above in that the flow cross-section of the channels of said section decreases from the inlet end to the outlet end.

Taking account of the liquid and gas streams which are present in a section in various locations in different states, according to the invention the flow cross-section of the channels of one or both sections is constructed such that it become smaller from the inlet towards the outlet. After all, the gas and liquid stream decreases towards the outlet, as a result of which a smaller volume is needed. By positioning the channels of the rectifier section and stripper section alongside one another it is possible to make optimum use of the space between the plates. With this arrangement it is, however, necessary that measures are taken for sealing the sections with respect to one another.

If the counter-flow principle is used, that is to say the outlet is below the inlet in the stripper section whilst the outlet is above the inlet in the rectifier section, convergence of adjacent channels can be implemented such that the axes thereof remain parallel.

According to a further preferred embodiment, the change in cross-section of the related channels is obtained by changing the distance between two opposing walls of the heat exchanger. The other walls (end plates) of the heat exchanger are parallel to one another.

A compact heat exchanger of this type can be produced by any method known from the state of the art. According to an advantageous embodiment, the channels are recessed in the plates and in particular are made therein by etching. Furthermore, it is possible to make the channels in one or more plates and to join these plates to one another in some manner known in the state of the art. In particular diffusion bonding is used for this purpose.

Compact heat exchangers have a larger heat exchange surface area per unit volume than shell-and-tube heat exchangers. As a result the installation concerned can be made more compact and the temperature differences can be limited, as a result of which the pressure difference can be reduced and thus a smaller and less expensive compressor can be used and the yield increases.

According to a further advantageous embodiment, it is possible to coat either the plates or added parts described above with, for example, catalyst material or to introduce such a catalyst material or some other reactant in granular form into the channels concerned.

Compact heat exchangers can easily be made of modular construction, as a result of which modifications to suit changing conditions can easily be made. Furthermore, it is possible to adjust the ratio between heat transfer surface area and mass transfer surface area, which is critical for a good design, in a particularly simple manner by adjusting the geometry of the compact heat exchanger. This applies in particular for the embodiment described above, where fins, for example extending in a corrugated shape, are arranged between the parallel plates. By adjusting the number and/or the spacing, the ratio between the heat transfer and mass transfer can be influenced.

The system described above can be used for stripping/rectifying a wide variety of types of substances. The various aspects are not restricted to hydrocarbons or propane/propene.

The compact heat exchanger can be constructed in a wide variety of ways. In general each vertical channel will be provided with a liquid inlet and gas outlet above the heat-exchanging surface and a gas inlet and a liquid outlet below the heat-exchanging surface. Moreover, these inlets and outlets of each channel must be arranged such that these can be connected to corresponding parts of other channels with the aid of a box or manifold. The separation between gas and liquid stream does not necessarily have to take place in each channel, but can also be carried out outside this. All that is important is that the incoming medium is uniformly distributed over the various channels so that optimum heat exchange and mass transfer can be provided. If appropriate, special measures can be taken for this purpose. This applies both at the gas outlet and liquid inlet and at the gas inlet and liquid outlet.

The invention will be explained in more detail below with reference to illustrative embodiments shown in the drawing. In the drawing.

Figure 1:
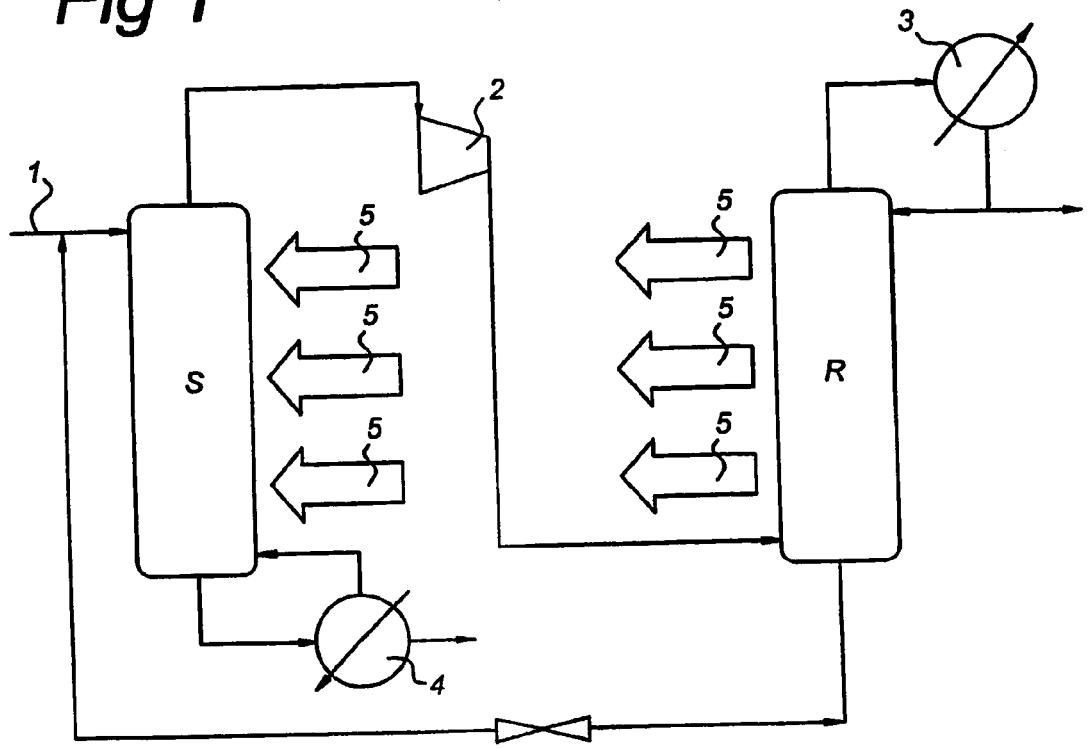
FIG. 1 shows the general functioning of the HIDiC concept.

A method for separating two components is shown diagrammatically in FIG. 1. The mixture to be separated is fed to a stripper section S at 1. The gaseous product is fed via a line to compressor 2 and compressed in a manner not shown in more detail and fed to rectifier section R. The liquid product produced in this section is returned to line 1. Gas is fed to condenser 3.

Liquid that is produced in stripper section S is fed to a reboiler 4, and then partially discharged as a bottom product. The heat transfer from the rectifier section to the stripper section is indicated by the arrows 5. It will be understood that it is important to allow this heat transfer to take place as efficiently as possible.

According to the invention this can be achieved with so-called compact heat exchangers.

Figure 2:
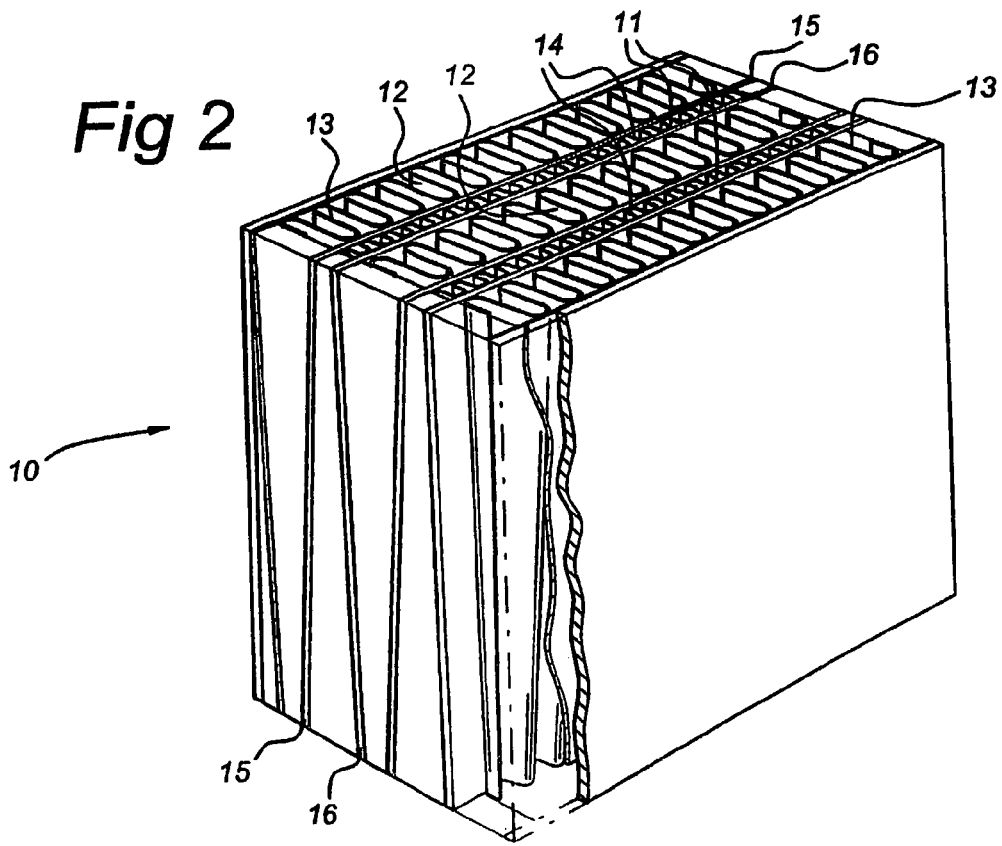
FIG. 2 shows a compact heat exchanger constructed as plate/fin heat exchanger.

An example of such a heat exchanger is given in FIG. 2, where a compact heat exchanger is indicated in its entirety by 10. This heat exchanger consists of alternating channels 11 and 12. There are fins 13 and 14, respectively, which extend in a meandering fashion in each of the channels. These fins are so arranged that the channels always extend vertically. Plates 15 and 16, respectively, are always located between channels 11 and 12.

As is clear from the drawing, the cross-sectional area of each channel changes from the bottom to the top. Channels 11 are part of the stripper section and have a cross-sectional area that increases from the bottom to the top. Channels 12 are part of the rectifier section and have a cross-sectional area that decreases from the bottom to the top. There is counter-current flow in both types of channels, with gas flowing upwards and liquid flowing downwards. The end plates of the channels, which are perpendicular to the heat-transfer plates 15 and 16, are parallel to one another. Channels and 11 and 12 can be provided with alternative fillings, such as structured packing, instead of fins, in order to improve the mass transfer. Various types of structured packing, based on gauze or wire mesh or corrugated plates, are well known to those skilled in the art of distillation.

The manifolds have not been included in this drawing.

Figure 3A:
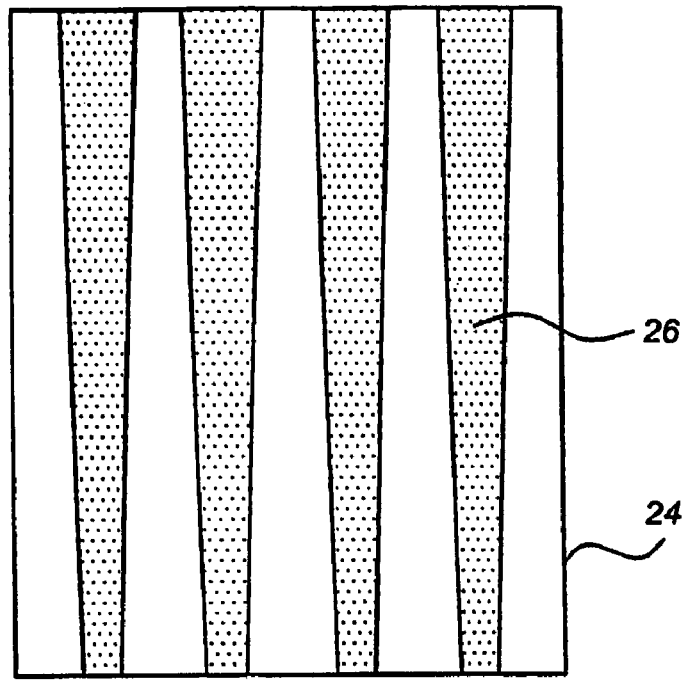
FIGS. 3a and 3b show the shape of channels in a particular compact heat exchanger.
Figure 3B:
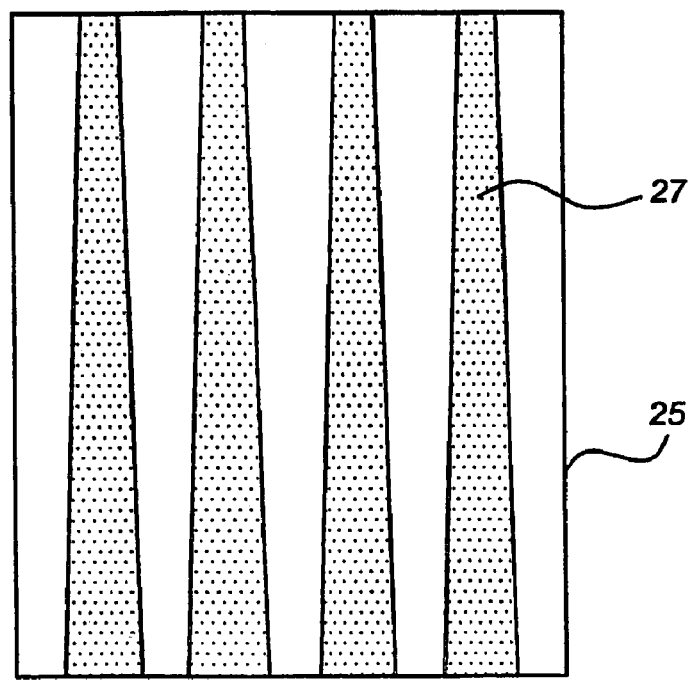

Plates 24 and 25, which are arranged in contact with one another and in which channels 26 and 27, respectively, have been made, are shown in FIGS. 3a and b. As can be seen, these channels are of convergent/divergent construction. FIG. 3a relates to the stripper section where the cross-section is decreased towards the bottom because a relatively smaller liquid and gas stream is present in this location. FIG. 3b shows a rectifier section where the channels are constructed precisely the other way round. Instead of being conical, the channels can also be made stepped or varying in cross-sectional dimension in some other way.

The channels can optionally be filled with a packing which contains a reagent or catalyst.

Figure 4A:
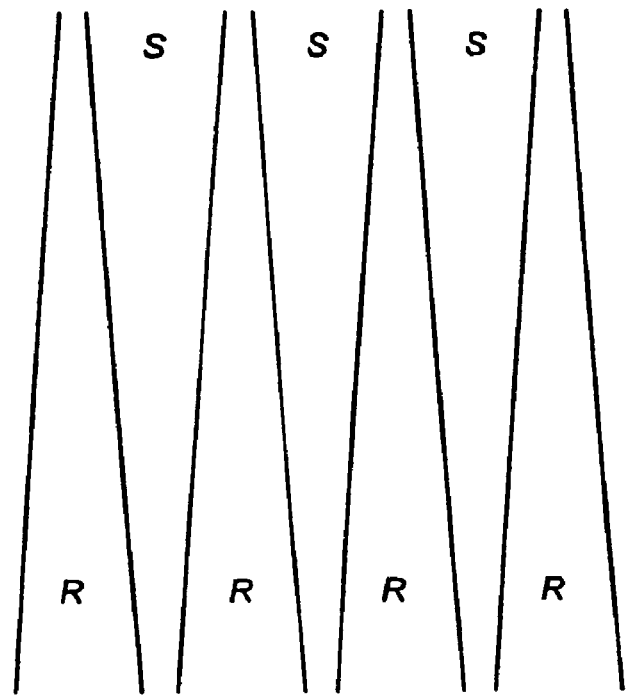
FIG. 4 shows an alternative for the construction in FIGS. 2 and 3.
Figure 4B:
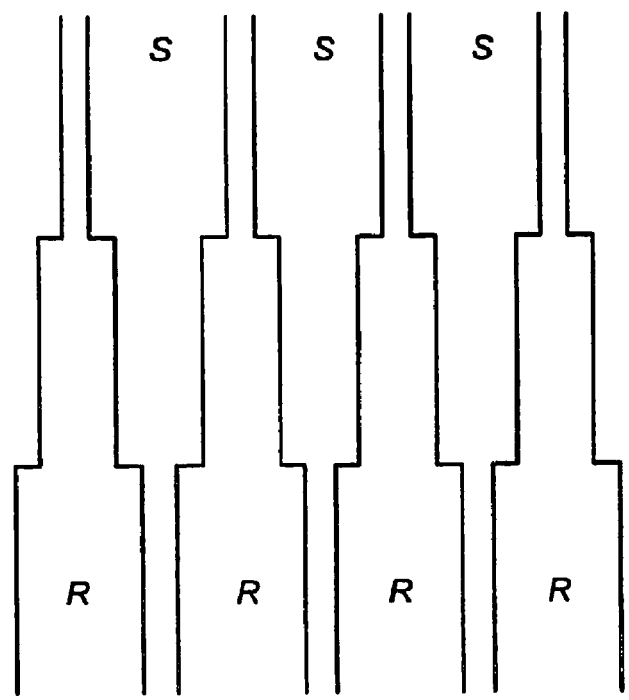

Variants for changing the cross-section of the channels are shown in FIGS. 4a and b. In these figures, in contrast to FIG. 3, the plates are not arranged in parallel. This is preferably a heat exchanger of the plate/fin type. In FIG. 4a the plates are inclined with respect to one another (as in FIG. 2) and in FIG. 4b the plates are of stepped construction.

Although the invention has been described above with reference to a few embodiments of a compact heat exchanger, it will be understood by those skilled in the art that further modifications are possible. Reference is made to compact heat exchangers such as are described in "Learning from experience with compact heat exchangers" by Prof. David Reay, published by the Centre for the Analysis and Dissemination of Demonstrated Energy Technologies. Furthermore, reference is made to the publication entitled "Compact heat exchangers" by J. E. Hesselgreaves, Pergamon, 2001. Heat exchangers can be in many different forms. Such variants fall within the scope of the present invention. An embodiment in which two parallel plates are wound together and which is indicated with spiral configuration may be mentioned as an example. The compressor can be designed depending on the process. The same applies in respect of the size and presence of the condenser and/or reboiler 3 and 4, respectively, as shown in FIG. 1.

These and further modifications are obvious to those skilled in the art after reading the above description and are within the scope of the appended claims.

The invention claimed is:

1. System for stripping and rectifying a fluid mixture, comprising:
   a counter-flow heat exchanger with channels closed on all sides with end inlet and end outlet for a stripper section and a rectifier section;
   a compressor being fitted between the inlets of said stripper section and rectifier section;
   said heat exchanger being made up of a series of adjacent parallel plates between which channels closed on all sides for said stripper section or rectifier section are alternately delimited;
   said channels extending essentially vertically and being so constructed that all liquid contained therein is able to move towards the bottom of said section; and
   said channels of said stripper section and rectifier section having a flow cross-section decreasing from the inlet end to the outlet end over the full height of said heat exchanger such that as one channel cross section increases over the full height of said heat exchanger, an adjacent channel cross section decreases.

2. System according to claim 1, wherein said flow cross-section gradually changes.

3. System according to claim 1, wherein said flow cross-section decreases stepwise.

4. System according to claim 1, wherein said channels comprise recesses in a plate.

5. System according to claim 4, wherein said channels have been etched out of said plate.

6. System according to claim 1, wherein the channels are delimited by plate sections placed on one another, which plate sections have been fitted to one another by diffusion bonding.

7. System according to claim 1, wherein the outlet end of said rectifier section is connected to a condenser.

8. System according to claim 1, wherein the outlet end of said stripper section is connected to a reboiler.

9. System according to claim 1, wherein the axis of the stripper section channels is parallel to the axis of the rectifier section channels.

* * * * *